Aug. 6, 1935. A. APPELGATE 2,010,250
MEANS FOR MAINTAINING THE AIR PRESSURE IN PNEUMATIC TIRES
Filed April 13, 1933 2 Sheets-Sheet 1
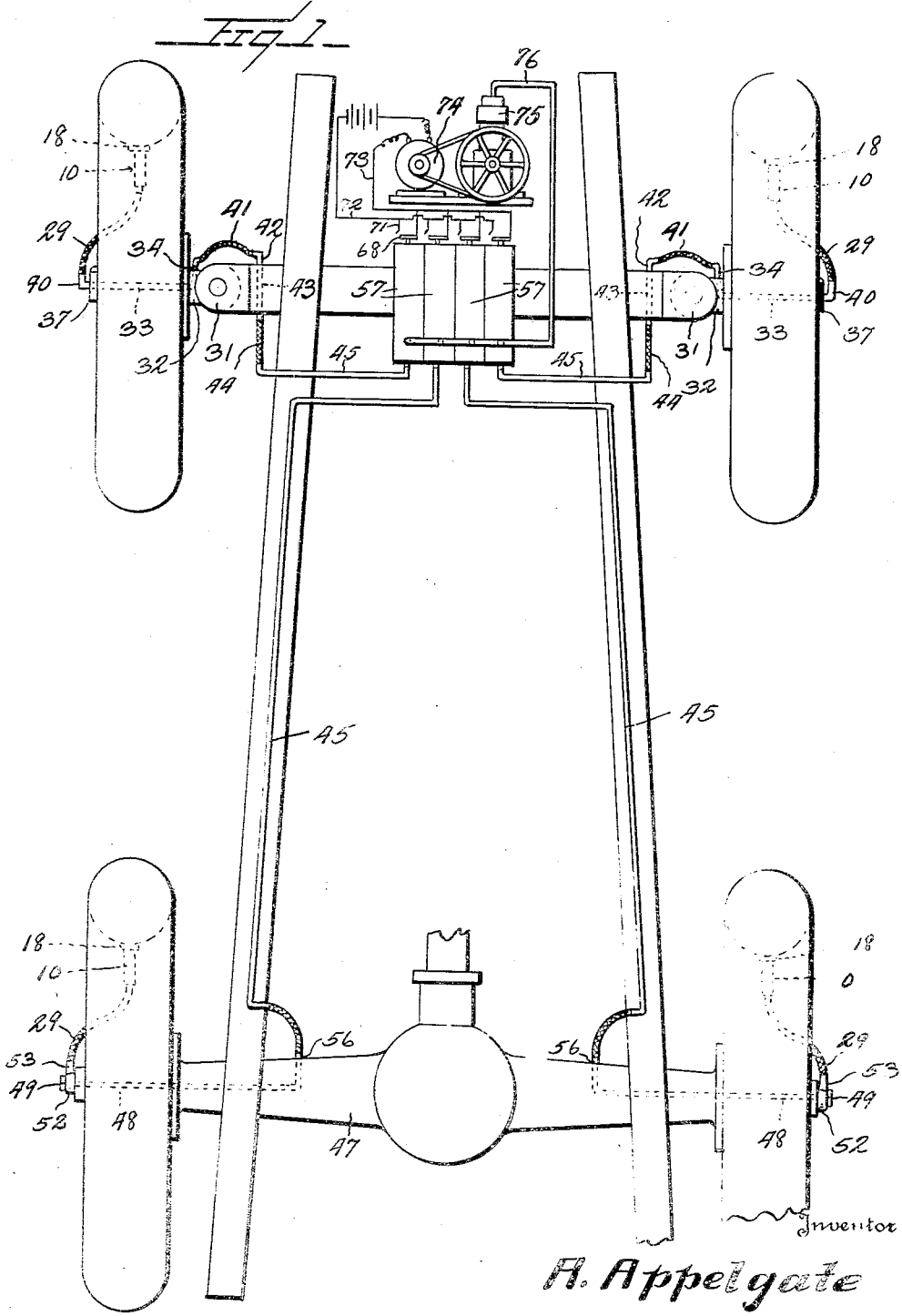

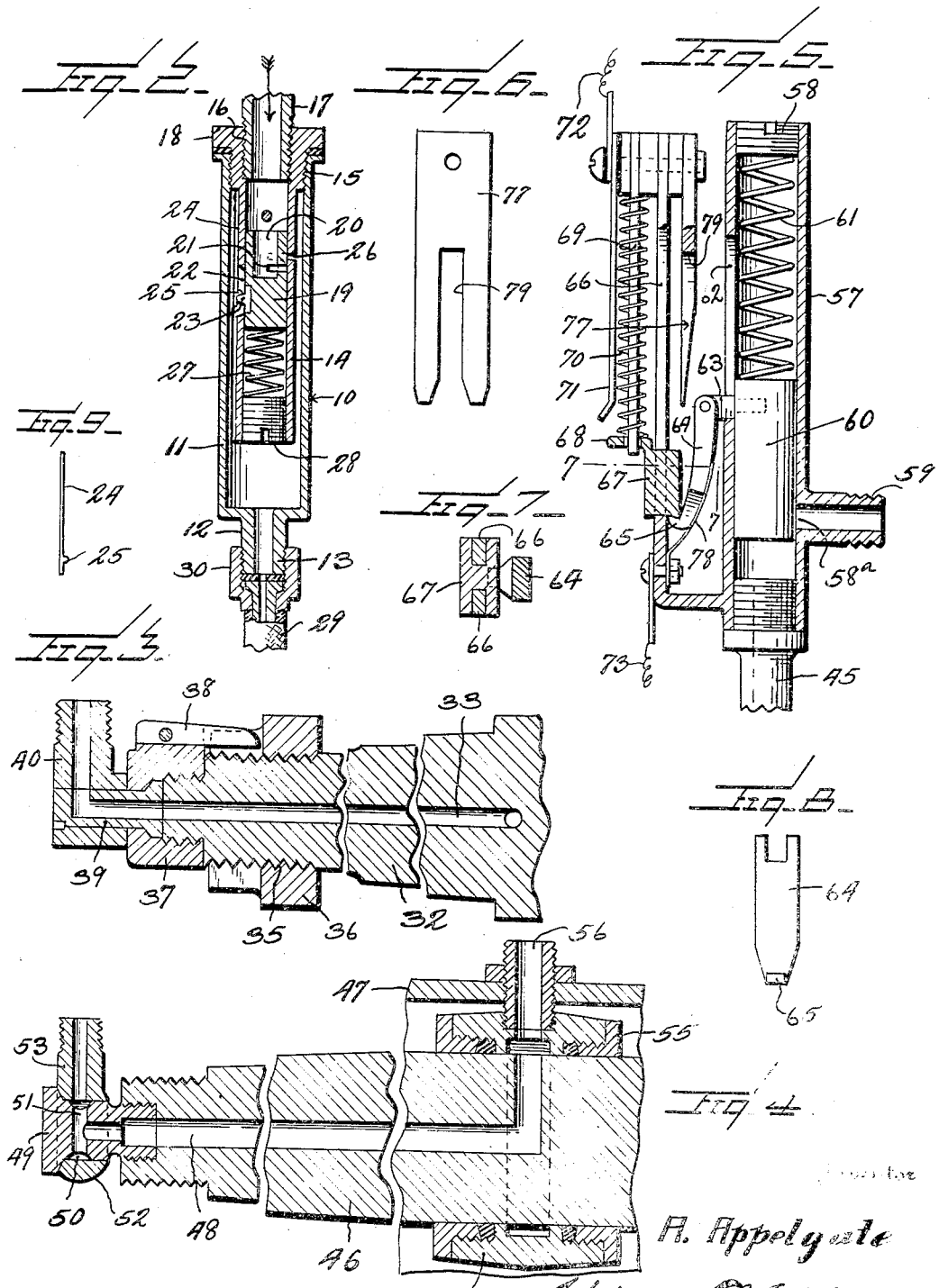

Patented Aug. 6, 1935

2,010,250

UNITED STATES PATENT OFFICE 2,010,250

MEANS FOR MAINTAINING THE AIR PRESSURE IN PNEUMATIC TIRES

Alva Appelgate, Toledo, Iowa, assignor of one-half to Sherman A. Freet, Toledo, Iowa Application April 13, 1933, Serial No. 666,021

13 Claims. (Cl. 152—11)

This invention relates to means for maintaining a constant air pressure in the tires of an automobile and particularly to means designed to work automatically to that end and including an air pump, a connection between the air pump and each tire, and means for causing the automatic starting of the pump when the pressure in any one tire falls below the desired amount, and means for automatically stopping the action of the pump when pressure has risen in that particular tire to the required amount.

The general object of this invention is to provide a mechanism of this character which may be readily applied to all makes of automobiles and which is so designed that the pressure does not have to be carried within a storage chamber or within the pump itself, but wherein communication between the pump and each tire is cut off so long as the tire carries its ordinary pressure.

A further object is to provide mechanism of this character which is entirely automatic, which will permit the ready removal and replacement of wheels and tires, and which is relatively simple as regards its mechanism.

A further object is to provide a construction of this character wherein each tire is provided with a primary control valve and a secondary control valve mounted on some convenient part of the frame of the machine, as for instance, upon the dash, the secondary control valve being connected to the primary control valve and the secondary control valve controlling the closing or opening of a circuit to an electrically driven air pump, the action of these parts being such that when the pressure within a tire decreases beyond normal, the primary control valve shifts to permit air pressure to pass from the tire to the secondary control valve, the secondary control valve being thus shifted to close a circuit through the pump and operate the pump, the pump ceasing its operation when the primary control valve has shifted to its cut off position and the pressure within the secondary control valve has been built up to a point that will automatically release the switch, all of which will be later explained.

Other objects will appear in the course of the following description.

The invention is illustrated in the accompanying drawings, wherein:—

Figure 1 is a top plan view of an automobile chassis with my invention applied thereto;

Figure 2 is a longitudinal sectional view through the primary controlling valve;

Figure 3 is a detailed longitudinal sectional view through one of the spindles of a front wheel;

Figure 4 is a longitudinal section through one end of the rear axle;

Figure 5 is a longitudinal sectional view of the secondary controlling valve;

Figure 6 is a face view of the finger for retracting the pawl;

Figure 7 is a section on the line 7—7 of Figure 5;

Figure 8 is a face view of the pawl;

Figure 9 is an edge elevation of the spring for detaining the piston of the primary valve.

In these drawings, I have illustrated only so much of an automobile with its tires as is necessary for an understanding of the invention. Each wheel carries upon the inside face of its rim a primary control valve designated generally 10. This consists of an outer cylindrical casing 11 having a nipple 12 at one end screw-threaded at 13 for engagement with a conductive pipe as will be later stated. This outer casing 11 is interiorly screw-threaded at its end adjacent the felloe of the wheel for engagement with an interior cylinder 14. This cylinder within its screw-threaded end 15 has interior threads 16 so that it may be engaged with the radially extending valve stem 17 of a tire. This valve stem is cut off so as to be shorter than the ordinary valve stem. This brings the primary valve close to the tire. The outer end of the cylinder 14 is formed with a hexagonal head 18 whereby it may be readily screwed home.

Operating within the interior of the cylinder 14 is a piston valve 19 which is tubular for a portion of its length as at 20. Adjacent the end wall of this tubular portion, there is formed a slot 21. The cylinder 14 is also longitudinally slotted as at 22 and the piston valve 19 has an outwardly extending lug 23 which projects through the slot 22. Attached to the base of the cylinder 14 is a leaf spring 24 having a beveled lug 25 on its extremity adapted to normally engage over this lug 23. The wall of the cylinder 14 opposite the slot 22 is formed with an arcuate slot 26 with which the slot 21 in the piston is adapted to coact. A compression spring 27 is disposed in the cylinder 14 and bears at one end against a screw-threaded plug 28 and at its other end bears against the piston valve 19 and urges the piston 19 outward. The spring 27 is of such strength that when the air within the tire is at normal pressure, the piston will be forced inward so that the slot 21 will be out of coincidence with the slot 26 but when the pressure within the tire decreases beyond a predetermined amount the spring will force the piston 19 outward until the slot 21 registers with the slot 26, whereupon the air from the interior of the tire can pass from cylinder 14, into the bore 20 in the piston 19, out through the slots 21 and 26 into the interior of the cylinder or casing 11 and out through the nipple 13, thus establishing communication, as will be more fully stated later, with the secondary valve.

The lug 25 on the leaf spring 24 is, of course, normally disposed outward of the lug 23 and while the spring 27 urges the piston outward, yet until the pressure of air within the tire is reduced beyond a predetermined point, the piston 19 cannot move outward. The piston can only move outward when the pressure has reduced so much that the spring 27 can overcome the impediment of the lug 25 and force the lug 23 past the lug 25. This secures a sudden and quick motion of the piston valve 19 from its closed to its open position and the same is true upon a reverse movement of the valve 19 from its open to its closed position. The valve, therefore, snaps into either one of its two positions.

Connected to the nipple 12 is a flexible tube 29 of rubber or like material having the usual screw-threaded couplings 30 on the extremities of the tube. One of these couplings is connected to the nipple 12 and the other coupling is intended to be connected to the hub of the wheel as will now be described.

The front and rear wheels must, of course, be differently connected to their respective couplings for the reason that the front wheels are mounted upon steering spindles while the rear wheels are mounted upon the ends of an axle which is driven. Referring to the front wheel connections, the axle in Figures 1 and 3 is designated 31. Mounted on this axle is the usual spindle 32. This spindle has a longitudinally extending bore 33 which communicates adjacent the inner end of the spindle with an angular nipple 34. This nipple must be relatively small in order to be accommodated in the small space afforded for it. The free end of the spindle is, of course, reduced and exteriorly screw-threaded at 35 for the usual castellated nut 36. Engaging the screw threads on the reduced extremity of the spindle is a cap nut 37 which carries a pivoted finger 38 adapted to engage with the castellated nut 36 so as to be held from rotation. Any usual or suitable nut locking means may be used for holding the castellated nut in place.

The cap nut 37 is provided at its end with a swiveled nipple 39 having a right angular extension 40 which is screw-threaded for engagement with the coupling at the adjacent end of the pipe 29 previously referred to. Thus it will be seen that as the front wheel rotates upon the spindle, the nipple 39 will also rotate with the wheel and communication will be established at all times between the pipe 29 and the nipple 34 as shown in Fig. 1. From this nipple 34 extends a flexible pipe 41 which leads to a nipple 42 mounted upon the axle 31 just inward of the yoke thereof. The axle has a transversely extending bore 43 with which the nipple 42 registers and from this bore 43, a pipe 44 extends which preferably is flexible and which communicates with a pipe 45 leading to the secondary valve to be later described.

The rear axle is designated 46 and is, of course, enclosed within a housing 47 and is driven as usual. This rear axle as shown in Figure 4 is formed with a longitudinally extending bore 48 within the outer end of which is screwed the nipple 49. This has a hexagonal head which closes the end of the nipple and the outer end of the nipple beyond the screw-threaded portion thereof is formed with a circumferential channel 50. The nipple has a central bore which has a port 51 opening upon this channel. Surrounding the outer end of the nipple is a sleeve 52 which in turn is provided with a screw-threaded nipple 53 which is adapted to engage with the pipe 29 leading to the nipple 12 of the corresponding primary valve 10. Here again, it will be seen that there is a swiveled connection provided between the conducting pipe 29 leading from the valve and the interior of the axle.

Surrounding the rotative axle 46 within the housing 47 is a hollow sleeve 54, the bore 48 in the axle opening through a port into the interior of this sleeve. The sleeve at its ends is provided with any suitable packing or provided with suitable packing glands and gland nuts 55 hold the sleeve in place but permit the sleeve to be held from rotation while the axle rotates freely within the sleeve. From each sleeve 54 extends a pipe 56 which for a portion of its length may be of rubber and the remainder of its length may be of copper pipe, this pipe being designated 45 in Figure 1 and leading to the corresponding secondary valve.

The secondary valves are all alike, there being four of these valves, one for each tire. In Figure 1 these valves are shown diagrammatically and as if the cylinders of the valves were horizontal but in actual practice the cylinders 11 of the valves will be vertical, as shown in Figure 5. One of these valves is illustrated in detail in Figure 5 in which 57 designates a cylinder closed at one end by a plug 58 and open at its opposite end, this open end being connected to one of the tubes 45 by any suitable means. This cylinder is provided with a laterally extending port 58ª and screw-threaded nipple 59 which is connected to an air pump as will be later stated. Within the cylinder 57 is disposed a piston valve 60 which is urged toward the pipe 45 by a spring 61 and which normally closes the port 58ª. This spring exerts much less pressure than the normal pressure within the tire. The cylinder 57 is slotted on one side as at 62 and the piston is provided with an outwardly extending lug 63 to which is pivoted on the exterior of the cylinder the downwardly extending pawl 64, the extremity of which is angularly bent as at 65.

Carried by the cylinder and extending parallel thereto is a guide 66 of metal. This guide is longitudinally slotted and operating in the slot of this guide is a slide 67, a portion of the slide being on the interior face of the guide 66 and a portion on the exterior face of the guide.

This slide 67 is metallic and carries upon its outer face the outwardly projecting flange 68 which is centrally apertured. Carried upon the upper end of the guide 66 is a downwardly extending guide pin 69 constituting a support 4 and surrounded by a coiled compression spring 70 which, as the lug 68 moves upward, is compressed. The lug 68 is apertured for the passage of the guide pin 69. Mounted upon the upper end of the guide 66 but insulated therefrom and from the guide pin 69 is a contact finger 71 disposed in the path of movement of the outer end of the lug 68, this contact finger being electrically connected to a conductor 72. The lower end of the guide 66 is also electrically connected to a conductor 73. It is necessary to insulate the finger 71 from the pin 69 and from guide 66 and insulate guide 66 from the release finger 77 so that no circuit through the wires 72 and 73 will be made until the finger 70 has reached lug 68 and that this circuit will be broken as soon as the finger 77 has released the pawl 64 and the spring 70 has forced the slide 67 downward.

It will be seen, therefore, that when the slide 67 moves upward with the piston 60, the contact lug 68 will come in contact with the contact finger 71 and a circuit will be completed through the conductors 72 and 73 to an electric motor indicated diagrammatically and designated generally 74. This motor is operatively connected in any manner to any suitable air pump indicated diagrammatically in Figure 1 and designated generally 75. The compression space or chamber of the air pump is connected by a pipe line 76 to the inlet nozzles 59 of each of the secondary valves. Thus when any one of the secondary valves is operated to lift the piston 60, a circuit will be closed through the pump and compressed air will flow through the pipe 76 to that particular cylinder 57 whose valve 60 has been raised.

It will be seen from Figure 5 that the pawl 64 is urged outward by means of the leaf spring 78 carried upon the lower end of the guide 66. For the purpose of detaching this pawl 64 from its engagement beneath the slide 67, I provide the release finger 77 mounted at its upper end upon the upper end of the guide 66. This finger is preferably slotted at 79 so as to provide two legs, each formed at its lower end with a beveled extremity. When the pawl has been carried upward a certain distance by the piston 60, these legs will engage on either side of the hook 65 on the pawl and will force the pawl inward, thus releasing the slide 67, which under the influence of the spring 70, is immediately returned to its initial position.

The operation of the secondary valve is as follows:—

Upon a reduction of air within a tire, the piston 19 of the corresponding primary valve 14 will shift under the action of the spring 27 after, of course, the lug 23 has passed the lug on the spring 24. This brings the slot 21 of the piston 19 into registry with slot 26 of cylinder 14 and air will flow from the corresponding tire through the slots 21 and 26 into the casing 11 from the nipple 12 through the pipe 29 and the hub connections previously described to the corresponding pipe 45 and to the lower end of the corresponding cylinder 57. This tire pressure, though it is lowered below normal, will be sufficient to cause the upward movement of the piston 60 of the corresponding cylinder 57 and as this moves upward a relatively short distance, it will pass the port 58ª so as to open communication between the pump and the pipe 45. This upward movement of the piston 60 causes, of course, the upward movement of the pawl 64 which carries with it the slide 67 and the lug 68 of this slide electrically engages the contact 71 closing a circuit through the pump so that as soon as the port 58 has been opened, the pump starts and air is forced through the pipes 76 and 45 into the tire to raise its pressure to normal. As the pressure rises in the sub-normal tire, it increases the pressure on the piston 19 until eventually this piston moves inward against the action of the spring 27, the spring being of exactly such strength as to resist any pressure less than the normal pressure to be maintained by the tire and as soon as the piston 19 has moved sufficiently, it will cut off communication between the interior of the cylinder 14 and the tire, thus cutting off communication between the pump and the tire. The pressure will now build up within the cylinder 57 below the piston 60, forcing the piston 60 still further upward in the cylinder and carrying upward the pawl 64 and the slide 67. This continues until the fingers 77 engage the pawl and force it outward away from the guide 66 and carry the lug 65 on the extremity of the pawl from beneath the slide 67. As soon as this occurs, the spring 70 forces the slide downward to its original position, breaking the circuit through the contact finger 71 and thus stopping the action of the pump. Of course, the piston 60 is at this time in its raised position but leakage will occur and gradually the piston 60 will return to its normal position under the action of the spring 61. Thus it will be seen that whenever a tire pressure is sub-normal, the primary valve acts to permit the pressure of this tire to act upon the secondary which in turn closes the circuit of the pump and causes the pumping of air back into the tire and that when the pressure within the tire becomes normal again, this communication with the pump is cut off and an instant afterwards the electric circuit of the pump motor is broken and the pump stops.

Thus without any effort on the part of the driver and without any attention from him, assuming that the parts are in proper repair, the tires will be maintained at all times with their proper pressure. The strength of the springs 27 is, of course, vital and these springs are carefully tested in the factory and carefully adjusted so as to cause the piston valve 19 to open port 26 as soon as the pressure is reduced in a tire below a certain point and to close the port as soon as the pressure within the tire has risen beyond a certain point. Of course, slight adjustment of the springs may be secured by the plug 28. I do not wish to be limited to any particular character of electric motor or electric pump.

It is obvious that instead of closing a circuit through a motor, which will drive a pump, the circuit could be closed through a magnetic valve which would open communication between a supply reservoir of compressed air and the selected secondary valve. However, I prefer the pump as it is at all times in condition for operation whereas with an air storage tank, there would be the necessity of having the pressure therein increased from time to time to maintain the pressure at the point desired.

What is claimed is:—

1. In an apparatus of the character described, a controlling valve operated by pressure from within a tire and including a cylinder having an opening at one end communicating with the interior of the tire and having an opening in its side wall, a hollow piston movable within the cylinder and having an opening normally out of coincidence with the opening in the side of the cylinder when the piston has been shifted outward by normal pressure in the tire, a spring within the cylinder urging the piston into a position where its port is in coincidence with the port in the cylinder, the spring having a pressure slightly less than the normal pressure to be maintained within the tire, the cylinder being slotted on one side and the piston having a beveled lug projecting through said slot, a leaf spring attached to said cylinder and having a beveled lug engageable with the lug on the piston when the piston is in a position with its port out of or in coincidence with the lateral port of the cylinder, and a casing enclosing and spaced from the cylinder and having a port and nipple leading therefrom.

2. In an apparatus of the character described, a controlling valve operated by pressure from within a tire and including a cylinder having an opening at one end communicating with the interior of the tire and having an opening in the side wall, a hollow piston valve movable within the cylinder and having an opening adapted when the piston valve is moved in one direction to coincide with the opening in the side of the cylinder, the pressure from within the interior of the tire, holding said piston in a position closing said opening in the cylinder, a spring within the cylinder urging the piston to a position where the opening in the piston is coincident with the opening in the cylinder, the spring having a pressure slightly less than the normal pressure to be maintained within the tire, means whereby the opening in the cylinder wall may be communicatively connected to a source of air under pressure, and means yieldingly holding the piston valve from movement in either direction until the pressure on one side or the other of the piston valve has become substantially greater than the pressure on the opposite side of the piston valve.

3. Means for maintaining a constant pressure of air in a tire including a pump and an electric motor for driving the pump, a controlling switch adapted when shifted in one direction to close a circuit through the motor, means urging the switch to its open position, a pressure operated member operatively connected to the switch to cause it to close, means for detaching the switch from engagement with said pressure operated member when the pressure operated member has moved in one direction a predetermined distance to thus permit the switch to return to an open position, means acting upon a decrease of normal pressure in the tire to communicatively connect the interior of the tire with the controlling member for the switch to thereby cause the controlling member to close the circuit through the motor, said controlling member acting when shifted under the pressure of air from the tire to communicatively connect the tire to the pump, said last named means being actuated when the pressure within the tire has risen to a predetermined point to disconnect the tire from its connection with the said member and with the pump.

4. Means for maintaining a constant pressure of air in a tire including a pump and an electric motor for driving the pump, a conduit connecting the pump to the tire, a controlling switch for the motor adapted when shifted in one direction to close a circuit through the motor, means urging the controlling switch in a direction to open said circuit, a pressure operated element in said conduit spring pressed in a direction to cut off communication between the tire and the pump, the pressure operated element being operatively connected to the switch to shift it to a closed position by a predetermined movement of said element under said pressure, a further predetermined movement acting to release the switch to thereby permit it to shift to a circuit breaking position and a pressure operated valve in said conduit held by predetermined pressure in the tire in a position cutting off communication between the tire and the conduit and means urging the valve into position communicatively connecting the interior of the tire with the conduit effective when the pressure within the tire falls a predetermined amount.

5. Means for maintaining a constant pressure of air within a tire including a pump, an electric motor for the pump, a conduit connecting the tire with the pump, a controlling switch for the motor urged to a circuit breaking position, a pressure operated element movable in one direction by pressure within the conduit but yieldingly urged to a position cutting off the passage of air through the conduit, said element when acted upon by an increase of pressure in the conduit opening a passage therethrough to the pump, an operative connection between said element and the switch causing the closing of the switch upon a predetermined movement of said element under pressure but releasing said switch upon a further movement of the element in the same direction, a valve in the conduit between the tire and the element controlling communication between the pump and the conduit and urged to a closed position by pressure within the tire, and means urging the valve to a position to open communication between the tire and the conduit effective when the pressure of air within the tire decreases below a predetermined amount.

6. Means for maintaining a constant pressure of air within a tire including a pump and an electric motor for the pump, and means actuated upon a decrease of pressure within a tire below a predetermined point to communicatively connect the tire with the pump and close the circuit through the motor, said means acting upon an increase of pressure within the tire to a predetermined point to cut off communication between the tire and pump and means operating to break the circuit to the motor.

7. Means for maintaining a constant pressure of air within a tire including a pump, an electric motor for the pump, an air pressure operated controlling switch adapted when shifted in one direction to close the circuit through the motor, means urging the switch in the other direction to break said circuit, a connecting conduit between the pump and the tire and connected to the pressure operated switch, means normally cutting off communication through said conduit between the pump and tire, and operating upon a decrease of normal pressure in the tire to permit communication through the conduit between the tire, the switch and the pump, the operation of said means permitting the pressure in the conduit to operate the switch in a direction to close the circuit, and acting automatically when the pressure within the tire has risen a predetermined amount to cut off communication between the tire and the pump and means operating when communication between the tire and pump is cut off to permit the switch to return to open position.

8. Means for maintaining a constant pressure of air within a tire including a pump, an electric motor for the pump, a controlling switch adapted when shifted in one direction to close the circuit through the motor, means urging the switch in the other direction to break said circuit, a connecting conduit between the pump and the tire, switch operating means in said conduit, means normally cutting off communication through said conduit between the pump and tire, and operating upon a decrease of normal pressure in the tire to open communication through the conduit between the tire and the pump, the opening of communication causing the movement of the switch operating means in a direction to close the circuit through said switch, and acting automatically when the pressure within the tire has risen a predetermined amount to cut off communication between the tire and the pump and means operating when the pressure within the conduit builds up to a predetermined point to permit the switch to return to its open position under the action of its urging means.

9. Means for maintaining a constant pressure of air within a tire including a pump, an electric motor therefor, a conduit connecting the pump with the tire, a valve controlling passage through said conduit and disposed adjacent the tire, means urging said valve in a direction to permit the flow of air from the tire into said conduit upon a predetermined decrease of pressure within the tire, said means permitting the valve to be held in a communication closing position by normal air pressure in the tire, a cylinder disposed in said conduit and forming part of the conduit, a piston valve disposed in the cylinder, means urging said piston valve to a position cutting off communication between the body of the conduit and the pump, the valve being shifted against the urging means by air pressure from the tire when communication is established between the tire and the conduit, a switch controlling the motor circuit and urged to a circuit breaking position, the piston valve having means for shifting said switch to a closed position upon a movement of the valve under air pressure against its urging means, and means causing the release of the switch from its connection with said piston valve upon a further movement of the piston valve in the same direction due to building up air pressure within the conduit.

10. Means for maintaining the air pressure within a tire including a pump, an electric motor therefor, a switch for the motor, a conduit connecting the tire with the pump, means acting upon a predetermined decrease of pressure in the tire opening a passage through said conduit to the pump and closing the switch, said means acting when the tire pressure has risen above a certain point to close communication between the tire and the pump and means actuated by the consequent building up of pressure within the conduit causing the switch to return to its open position.

11. Means for maintaining a constant pressure of air within a tire including a pump, an electric motor therefor, a conduit connecting the pump with the tire, a switch adapted when shifted in one direction to close the circuit through the motor, means urging the switch in the other direction to break said circuit, a connecting conduit between the pump and the tire, a piston valve disposed within said conduit adjacent the tire, a spring urging the piston valve to a position to open communication between the tire and the conduit, the opposite side of the piston valve being open to the tire whereby pressure within the tire above a predetermined amount will cause the piston valve to shift against the action of the spring to close communication between the tire and the conduit, a second piston valve in said conduit, a spring urging the second piston valve to a position normally cutting off communication between the body of the conduit and the pump, the second named piston valve opening communication between the conduit and the pipe upon a predetermined increase of pressure within the body of the conduit, means carried by the last named piston valve causing a closing of said switch when the second named valve is shifted to open communication between the body of the conduit and the pump and means detaching the second named piston valve from said switch upon a further movement of the piston valve against the action of said spring due to a building up of pressure within the body of the conduit beyond a predetermined point whereby to permit the return of the switch to its circuit breaking position.

12. Means for maintaining a constant pressure of air within a tire including a pump, an electric motor for the pump, a controlling switch for the pump circuit including a stationary switch element and a movable switch element, a spring urging the movable switch element out of engagement with the fixed switch element, a conduit, a cylinder connected to the conduit and having a branch extending to the pump, a piston within the cylinder, a spring urging the piston valve to a position to close the branch leading to the pump, a pawl carried by the piston valve and urged into operative engagement with the movable contact, whereby an initial movement of the piston valve will close the circuit to the motor, means disposed in the path of movement of the pawl detaching the pawl from its engagement with the movable contact upon a predetermined movement of the piston valve against the action of its spring, a valve casing forming part of the conduit, a cylinder disposed within the valve casing and having a lateral port opening into the valve casing, the cylinder opening into the tire, a piston valve disposed within the cylinder and exposed on one side to the pressure within the tire, and a spring urging the piston valve to open said port upon a predetermined reduction of pressure within the tire.

13. Means for maintaining a constant pressure of air within a tire including, in combination a tire, a pump, an electric motor for the pump, a cylindrical valve casing having a port on one side in communication with the pump, and a conduit connected to one end, the valve casing having a piston valve therein, spring held in a position to close the port but movable under pressure to open said port to said conduit, contact elements associated with the valve casing and disposed in a normally open circuit to the motor, one of said contact elements being fixed and the other being mounted for sliding movement with said piston valve to a position to close the circuit through said contacts and a valve associated with the tire and comprising a second valve casing having an opening leading into the tire and a laterally disposed part, a second piston valve disposed within the second casing and acted on by pressure through said opening, the pressure holding the second piston valve in a position to close the port leading from the second case, a spring urging the second piston valve to a position where the lateral port will open and means operatively connecting said lateral port to the second valve casing with the conduit connected to the first named valve casing, the spring of the second mentioned piston valve being yieldable to permit the valve to close the port in the second casing at a predetermined pressure, whereby upon decrease of pressure in the tire below said piston valve, the port in the second mentioned valve will be opened to admit air pressure from the tire to the first mentioned cylindrical casing to shift the piston valve therein and open said first named port and to actuate the switch to close the electrical circuit, the spring of the first mentioned piston valve having a greater range of movement and resistance than the spring of the second piston, whereby after the predetermined pressure has closed the second mentioned valve the first mentioned piston will continue to move under accumulated back pressure, and means operable by said continued movement for actuating the movable contact element for breaking the electrical circuit.

ALVA APPELGATE.